United States Patent
Liu et al.

(10) Patent No.: US 9,736,718 B2
(45) Date of Patent: Aug. 15, 2017

(54) WIRELESS COMMUNICATION APPARATUS, WIRELESS STATION APPARATUS AND WIRELESS COMMUNICATION METHOD

(71) Applicant: Panasonic Intellectual Property Management Co., Ltd., Osaka (JP)

(72) Inventors: Weijie Liu, Kanagawa (JP); Ken Naka, Tokyo (JP)

(73) Assignee: Panasonic Intellectual Propery Management Co., LTD., Osaka (JP)

(*) Notice: Subject to any disclaimer, the term of this patent is extended or adjusted under 35 U.S.C. 154(b) by 211 days.

(21) Appl. No.: 14/463,671

(22) Filed: Aug. 20, 2014

(65) Prior Publication Data

US 2015/0063105 A1 Mar. 5, 2015

(30) Foreign Application Priority Data

Sep. 2, 2013 (JP) ................................ 2013-181382

(51) Int. Cl.
*H04W 28/02* (2009.01)
*H04L 12/859* (2013.01)
(Continued)

(52) U.S. Cl.
CPC ..... *H04W 28/0215* (2013.01); *H04L 47/2475* (2013.01); *H04L 47/26* (2013.01); *H04W 48/10* (2013.01)

(58) Field of Classification Search
CPC .... H04L 47/2475; H04L 47/26; H04W 24/08; H04W 28/0215
See application file for complete search history.

(56) References Cited

U.S. PATENT DOCUMENTS

2006/0045059 A1* 3/2006 Yun .................... H04W 74/002
370/338
2006/0104370 A1* 5/2006 Yamanaka ............ H04L 1/0003
375/242

(Continued)

FOREIGN PATENT DOCUMENTS

JP 2007-053548 3/2007

*Primary Examiner* — Noel Beharry
*Assistant Examiner* — Rodrick Mak
(74) *Attorney, Agent, or Firm* — Seed IP Law Group LLP

(57) ABSTRACT

A wireless communication apparatus which communicates with at least one wireless station apparatus by utilizing EDCA mechanism includes the following elements. A first channel state determining unit determines a usage state of a communication channel used between the wireless communication apparatus and the wireless station apparatus in a contention period of the communication channel. A first terminal occupation time calculating unit calculates, on the basis of the usage state, a different-terminal occupation time in the contention period of the communication channel. A first traffic measuring unit measures an amount of data received from the wireless station apparatus in the different-terminal occupation time. A first parameter adjusting unit adjusts an EDCA parameter set used in the EDCA mechanism, on the basis of the different-terminal occupation time and the amount of received data. A parameter updating unit updates the EDCA parameter set to an adjusted EDCA parameter set.

14 Claims, 6 Drawing Sheets

(51) Int. Cl.
*H04L 12/825* (2013.01)
*H04W 48/10* (2009.01)

(56) References Cited

U.S. PATENT DOCUMENTS

| | | | | |
|---|---|---|---|---|
| 2006/0120399 | A1* | 6/2006 | Claret | H04L 12/413 |
| | | | | 370/445 |
| 2007/0183326 | A1* | 8/2007 | Igarashi | H04L 65/80 |
| | | | | 370/230 |
| 2008/0069040 | A1* | 3/2008 | An | H04W 74/008 |
| | | | | 370/329 |
| 2010/0329231 | A1* | 12/2010 | Sekiya | H04B 7/005 |
| | | | | 370/345 |
| 2012/0176925 | A1* | 7/2012 | Hwang | H04W 24/10 |
| | | | | 370/252 |
| 2012/0294142 | A1* | 11/2012 | Kneckt | H04W 74/002 |
| | | | | 370/229 |
| 2013/0223427 | A1* | 8/2013 | Sohn | H04W 74/06 |
| | | | | 370/338 |
| 2013/0272272 | A1* | 10/2013 | Sudak | H04W 72/0446 |
| | | | | 370/336 |
| 2013/0286998 | A1* | 10/2013 | Tamai | H04W 76/048 |
| | | | | 370/329 |
| 2015/0350949 | A1* | 12/2015 | Wang | H04W 16/14 |
| | | | | 370/230 |

* cited by examiner

| ACCESS CATEGORY | AIFSN | CWmin − CWmax | TXOP |
|---|---|---|---|
| AC_VO | 2 | 3 − 7 | 1.5 ms |
| AC_VI | 2 | 7 − 15 | 3 ms |
| AC_BE | 3 | 15 − 1023 | 1 frame |
| AC_BK | 7 | 15 − 1023 | 1 frame |

WIRELESS COMMUNICATION APPARATUS, WIRELESS STATION APPARATUS AND WIRELESS COMMUNICATION METHOD

CROSS REFERENCES TO RELATED APPLICATIONS

The present disclosure contains subject matter related to Japanese Patent Application. No. 2013-181382 filed in the Japan Patent Office on Sep. 2, 2013, the entire contents of which are incorporated herein by reference.

TECHNICAL FIELD

The present disclosure relates to a wireless communication apparatus and wireless station apparatus that performs communication by using an Enhanced Distributed Channel Access (EDCA) system of the IEEE802.11 standard and to a wireless communication method used in such a wireless communication apparatus and wireless station apparatus.

DESCRIPTION OF THE RELATED ART

In communication among a plurality of wireless communication apparatuses and wireless station apparatuses, a priority based control method, for example, is utilized in order to provide a Quality of Service (QoS) function. In IEEE Std 802.11e, EDCA is defined as a priority based control, method. In EDCA, data packets received, from a higher layer of a communication application are classified into four access categories (ACs). Recommended values of an EDCA parameter set, which is used for data transmission, are set for each of the four classified ACs.

Examples of the recommended values of the EDCA parameter sets are shown in FIG. 12. In EDCA, as shown in FIG. 12, data packets are classified into four ACs, that is, AC_VO (Voice), AC_VI (Video), AC_BE (Best-Effort), and AC_BK (Background), in descending order of priority. For each of the four ACs, Arbitration Interframe Space Number (AIFSN), CWmin, CWmax, and Transmission Opportunity (TXOP), are set as EDCA parameters.

AIFSN is a parameter used for calculating a carrier sense period (Arbitration Interframe Space (AIFS)). CWmin and CWmax are parameters used for determining a range of random backoff time (Contention Window (CW)). TXOP is a parameter indicating a permitted period for which a wireless communication apparatus is capable of continuously transmitting data packets.

EDCA parameter sets are set by a wireless communication apparatus which serves as a wireless base station apparatus, and in microwave communication, EDCA parameter sets are set by an access point (AP), and in millimeter wave communication, EDCA parameter sets are set by a Personal Basic Service Set (PBSS) control point (PCP). An AP or a PCP broadcasts an EDCA parameter set to each wireless station apparatus (STA) by using a beacon signal. A wireless station apparatus may be referred to as a "wireless terminal apparatus".

SUMMARY

Japanese Unexamined Patent Application Publication No. 2007-53548 discloses a wireless base station apparatus that employs the IEEE802.11e standard in order to suppress a decrease in the throughput caused by an increased packet collision rate in a situation where wireless station apparatuses (STA) which transmit data by using AC_VI and wireless station apparatuses (STA) which transmit data by using AC_VO are used together.

When setting an EDCA parameter set which is adaptable to a communication environment, the wireless base station apparatus disclosed in this publication monitors traffic of data packets classified as each of the specific ACs, that is, each of the priority levels, and measures the number of wireless terminal apparatuses which transmit a certain amount of traffic and a channel occupancy rate. Then, on the basis of the measurement results, the wireless base station apparatus selects an EDCA parameter set which makes it possible to suppress an increase in the packet collision rate.

In the wireless base station apparatus disclosed in this publication, in a situation where short distance wireless communication using a millimeter wave band (hereinafter referred to as "millimeter wave communication") is performed, the communication QoS may be decreased. In millimeter wave communication, since the communication range is small, the communication area is narrow, and thus, there are less wireless terminals that perform communication at the same time. Accordingly, there is a small possibility that the throughput will be decreased due to an increase in the packet collision rate caused by a large number of wireless terminals.

On the other hand, however, due to a fast transmission rate in millimeter wave communication, the millimeter band in an idle state may occur depending on the amount of data to be transmitted. That is, there may be an imbalance between the amount of data to be transmitted and TXOP. Additionally, in millimeter wave communication, since the communication range is small and strong directivity is exhibited, the radio field intensity in a receiver sharply fluctuates, thereby increasing the possibility that the interruption of reception will occur. In millimeter wave communication, due to its strong directivity, the possibility that radio waves will be interrupted by the movement of a surrounding object is high. Because of the above-described reasons, it is difficult to address a decrease in the communication QoS caused by the factors unique to millimeter wave communication by using the related art, such as the technology disclosed in the above-described publication.

One non-limiting and exemplary embodiment provides a wireless communication apparatus that is capable of suppressing a decrease in the quality of service in millimeter wave communication.

Additional benefits and advantages of the disclosed embodiments will be apparent from the specification and figures. The benefits and/or advantages may be individually provided by the various embodiments and features of the specification and drawings disclosed, and need not all be provided in order to obtain one or more of the same.

A wireless communication apparatus of an embodiment of the present disclosure is a wireless communication apparatus which communicates with at least one wireless station apparatus by utilizing an EDCA mechanism. The wireless communication apparatus includes: a first channel state determining unit that determines, per unit time, a usage state of a communication channel which is used between the wireless communication apparatus and the wireless station apparatus in a contention period of the communication channel; a first terminal occupation time calculating unit that calculates, on the basis of the usage state, a different-terminal occupation time included in the contention period of the communication channel; a first traffic measuring unit that measures an amount of data received from the wireless station apparatus in the different-terminal occupation time; a first parameter adjusting unit than adjusts an EDCA parameter set used in the EDCA mechanism, on the basis of the different-terminal occupation time and the amount of data received from the wireless station apparatus; and a parameter updating unit that updates the EDCA parameter set to the adjusted EDCA parameter set.

These general and specific aspects may be implemented using a system, a method, a computer program, and any combination of systems, methods, and computer programs.

In the wireless communication apparatus according to an embodiment of the present disclosure, it is possible to suppress a decrease in the quality of service in millimeter wave communication.

DETAILED EMBODIMENTS

Embodiments of the present disclosure will be described below with reference to the accompanying drawings. In the following embodiments, a wireless communication system utilizing millimeter waves which conforms to IEEE Std 802.11ad will be discussed by way of example. The content of the disclosure, however, is also applicable to a wireless communication system utilizing microwaves.

First Embodiment

Figure 1:
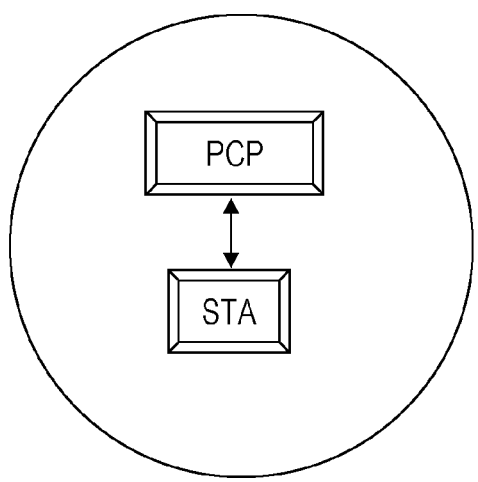
FIG. 1 illustrates a wireless communication, system including one PCP and one STA.

A wireless communication system utilizing millimeter waves includes, as shown in FIG. 1, one Personal Basic Service net (PBSS) control point (PCP), as a wireless communication apparatus, and one wireless station apparatus (STA). A traffic stream transmitted from the STA to the PCP is called an upstream, while a traffic stream transmitted from the PCP to the STA is flailed a downstream. The PCP determines an EDCA parameter set which discussed above and broadcasts it, to the STA by using a beacon signal. The STA then transmits data to the PCP in accordance with the broadcast EDCA parameter set.

Figure 2:
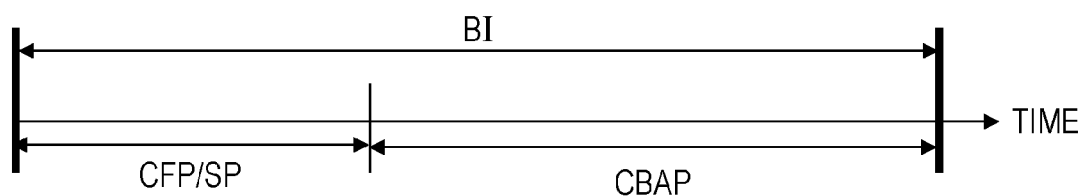
FIG. 2 illustrates an example of the configuration of a communication channel used between a PCP and an STA.

FIG. 2 illustrates an example of the configuration of a communication channel used between the PCP and the STA. In FIG. 2, a beacon interval (BI) indicates a beacon period. A contention free period (CFP) or a service period (SP) indicates a non-contention band (non-contention period) in which the contention of multiple access does not occur, and a contention-based access period (CBAP) indicates a contention band (contention period) in which the contention of multiple access occurs.

Figure 3:
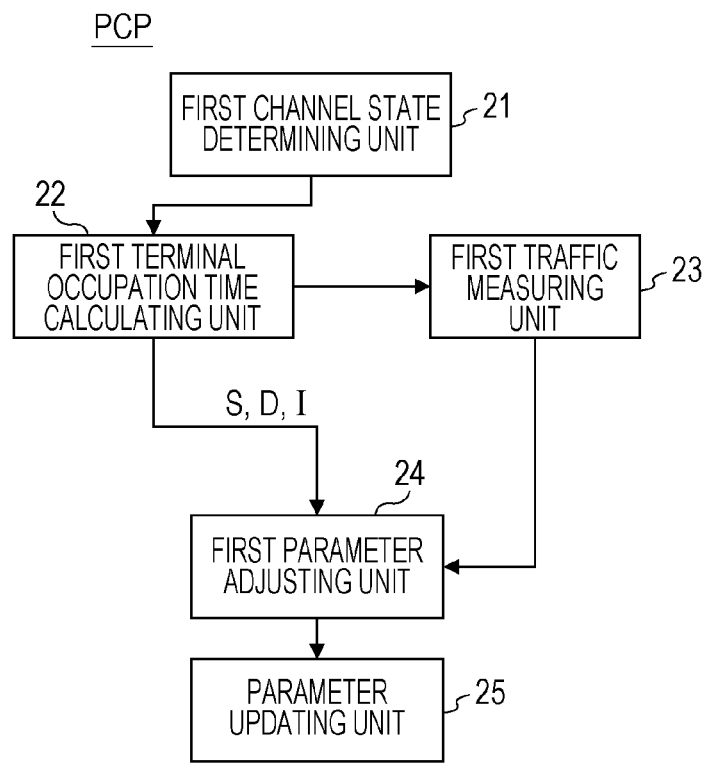
FIG. 3 is a block diagram illustrating an example of the internal configuration of a PCP of a first embodiment.

FIG. 3 is a block diagram illustrating an example of the internal configuration of the PCP of the first embodiment. The PCP includes, as shown in FIG. 3, a first channel state determining unit 21, a first terminal occupation time calculating unit 22, a first traffic measuring unit 23, a first parameter adjusting unit 24, and a parameter updating unit 25.

Figure 4:
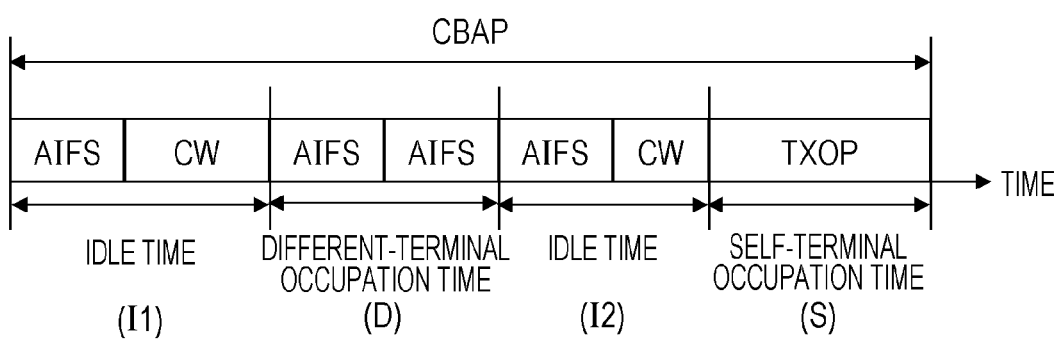
FIG. 4 illustrates an example of the temporal configuration of a contention-based access period (CBAP) based on a determination result, obtained from a first channel state determining unit.

The first channel state determining unit 21 determines whether the CBAP, which is a contention period of a communication channel, is in the carrier sense period (AIFS), the backoff time (CW), or the transmission period (TXOP) defined in the EDCA mechanism. That is, since the application range of the EDCA mechanism is the CBAP, the first channel state determining unit determines the communication channel state in the CBAP shown in FIG. 2. FIG. 4 illustrates an example of the temporal configuration of the CBAP based on a determination result obtained from the first channel state determining unit 21.

The first terminal occupation time calculating unit 22 classifies, on the basis of the determination result obtained from the first channel state determining unit 21, the CBAP of the communication channel into a self-terminal occupation time (S), a different-terminal occupation time (D), and an idle time (I) according to the following equations (1) through (3), and then calculates total time at each classification in the first embodiment, the self-terminal is the PCP, and the different terminal is the STA, $$\text{Self-terminal occupation time } (S) = \sum TXOP \qquad (1)$$

$$\text{Different-terminal occupation time } (D) = \sum_{(carrier\ sense\ result=busy)} AIFS \qquad (2)$$

$$\text{Idle time } (I) = \sum CW + \sum_{(carrier\ sense\ result=idle)} AIFS \qquad (3)$$

In the example shown in FIG. 4, the total idle time (I) is represented by "I1+I2". In equation (2), "carrier sense result=busy" indicates that, as a result of performing carrier sense by the self-terminal (PCP), the communication channel is found to be occupied by a different terminal (STA). The different-terminal occupation time (D) does not include the self-terminal occupation time (S).

In equation (3), "carrier sense result=idle" indicates that, as a result of performing carrier sense by the self-terminal (PCP), the communication channel is found to cc in the idle state since it is not occupied by any terminal.

The first terminal occupation time calculating unit 22 adds AIFSs used in "carrier sense result=busy" to the different-terminal occupation time (D), and adds AIFSs used in "carrier sense result=idle" to the idle time (I).

In the example shown in FIG. 4, one different-terminal occupation time (D) and one self-terminal occupation time (S) are included in the CBAP of the communication channel. However, plural different-terminal occupation times (D) and/or plural self-terminal occupation times (S) may be included in the CBAP. In FIG. 4, the different-terminal occupation time (D) and the self-terminal occupation time (S) both have one component. If there are plural components, for example two D components (D1 and D2), and three S components (S1, S2, and S3), then the different-terminal occupation time (D) is total of D1 and D2 and the self-terminal occupation time (S) is total of S1, S2 and S3.

The first traffic measuring unit 23 measures the amount of data received from the STA in each different-terminal occupation time (D) calculated by the first terminal occupation time calculating unit 22. The first traffic measuring unit 23 may measure the amount of data transmitted from the PCP in the self-terminal occupation time (S).

The first parameter adjusting unit 24 calculates an average value $\mu D$ of the different-terminal occupation times (D) (hereinafter referred to as an "average different-terminal occupation time") calculated by the first terminal occupation time calculating unit 22. The average different-terminal occupation time $\mu D$ is an average value of the different-terminal occupation times D during a certain period which is longer than the different-terminal occupation time (D).

That is, the first parameter adjusting unit 24 calculates the average different-terminal occupation time $\mu D$ from the quantity of different-terminal occupation times (D) included in the certain period and the time length of each different-terminal occupation time (D).

In communication between one PCP and one STA, as in the first embodiment, the average different-terminal occupation time $\mu D$ is equal to the time for which the STA transmits data to the PCP. That is, in FIG. 4, there is one different-terminal occupation time D including two AIFSs, and the average different-terminal occupation time $\mu D$ is the total time of the two AIFSs.

The first parameter adjusting unit 24 also calculates an average value V of the amounts of data (hereinafter referred to as "traffic") received from a different terminal in each different-terminal occupation time (D) measured by the first traffic measuring unit 23 during the certain period. The first parameter adjusting unit 24 may evaluate a currently used EDCA parameter set on the basis of the average different-terminal occupation time $\mu D$ and the traffic V, and adjust the currently used EDCA parameter set.

Figure 5:
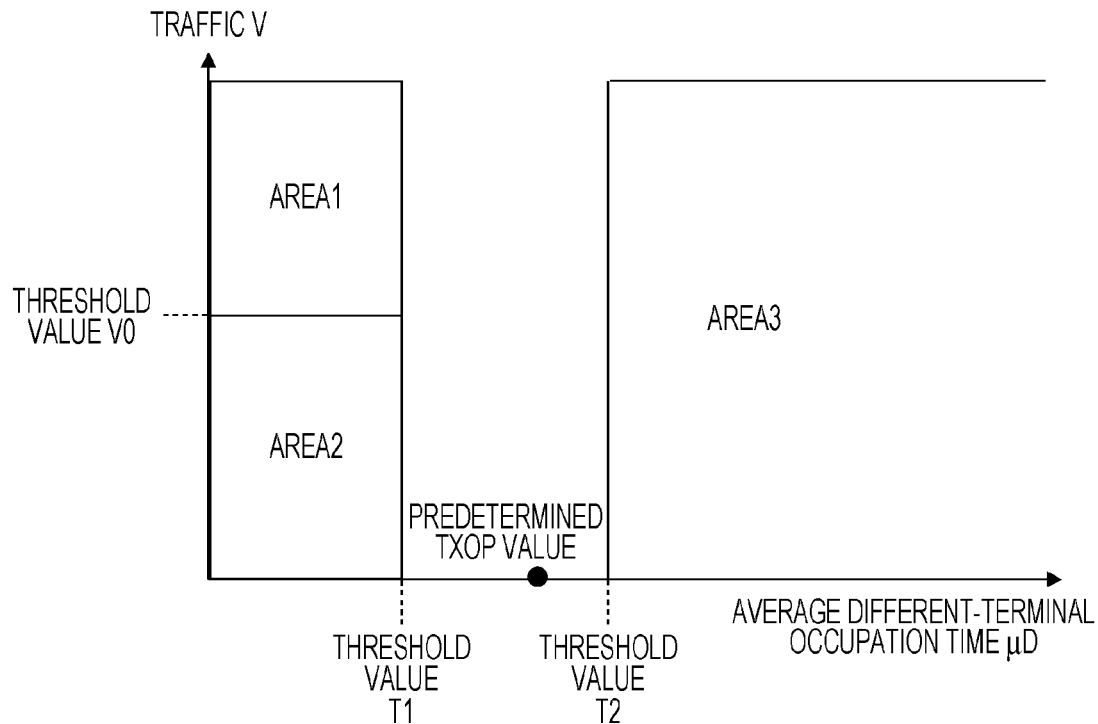
FIG. 5 is a graph illustrating an example of an adjusting area which is divided by using threshold values in order to adjust an EDCA parameter set by a first parameter adjusting unit.

FIG. 5 is a graph illustrating an example of an adjusting area which is divided by using threshold values in order to adjust an EDCA parameter set by the first parameter adjusting unit 24. In the graph of FIG. 5, the horizontal axis indicates the average different-terminal occupation time $\mu D$, while the vertical axis indicates the traffic V. In the adjusting area shown in FIG. 5, three divided adjusting area AREA1, AREA2, and AREA3 are disposed.

The adjusting area AREA1 is an area in which the average different-terminal occupation time $\mu AD$ is equal to or smaller than a threshold value T1 and the traffic V is equal to or greater than a threshold V0. The adjusting area AREA2 is an area in which the average different-terminal occupation time $\mu D$ is equal to or smaller than the threshold value T1 and the traffic V is equal to or smaller than the threshold V0. The adjusting area AREA3 is an area in which the average different-terminal occupation time $\mu D$ is equal to or greater than a threshold value T2.

The threshold values T1 and T2 may be determined, by using, as a reference value, a predetermined TXOP value of the EDCA parameter set used for the STA (different terminal) (hereinafter simply referred to as the "STA EDCA parameter set"), which is set on the basis of the traffic measured by the first traffic measuring unit 23. In FIG. 5, the threshold value T1 is set to be smaller than the predetermined TXOP value, while the threshold value T2 is set to be greater than the predetermined TXOP value. The threshold value V0 concerning the traffic is set by considering, for example, the product of the transmission rate of the STA and the predetermined TXOP value. A plural number of thresholds may be set for each of the threshold values V0, T1, and T2. That is, the adjusting area which is set in accordance with the average different-terminal occupation time $\mu D$ and the traffic V may further be divided into smaller areas.

In the state of current communication included in the adjusting area AREA1, the average different-terminal occupation time $\mu D$, which is equal to the time for which the STA transmits data to the PCP, is short, and the traffic V received from the STA by the PCP is large. Accordingly, the bitrate in the wireless channel between the STA and the PCP may be sufficiently high, that is, it may be predicted that there is no obstacle in the communication path.

In the adjusting area AREA1, the STA is capable of transmitting data to the PCP with a TXOP smaller than the predetermined TXOP value. Accordingly, there is not enough amount of data to be transmitted within the time length of the predetermined TXOP value. That is, a TXOP, which is a time length for which the STA transmits data to the PCP, may be shorter than the predetermined TXOP value. Thus, the first parameter adjusting unit 24 may decrease the TXOP of the STA EDCA parameter set.

In the state of current communication included in the adjusting area AREA2, the average different-terminal occupation time $\mu D$, which is equal to the time for which the STA transmits data to the PCP, is short, and the traffic V received from the STA by the PCP is also small. Accordingly, it may be predicted that there may be a certain obstacle in the wireless channel between the STA and the PCP. Thus, the first parameter adjusting unit 24 decreases the TXOP of the STA EDCA parameter set or increases the frequency with which the STA accesses the communication channel.

In the state of current communication included in the adjusting area AREA3, the average different-terminal occupation time $\mu D$ is longer than the predetermined TXOP value, which is a specified transmission time. Accordingly, it may be predicted that communication performed by a communication apparatus different from the STA, which is the communication partner of the PCP, is interfering with the communication performed between the STA and the PCP. In this case, the first parameter adjusting unit 24 decreases the TXOP of the STA EDCA parameter set or increases the frequency with which the STA accesses the communication channel.

There are two approaches to adjusting the frequency with which the STA accesses the communication channel: in one method of adjusting the STA EDCA parameter set, and in the other method of adjusting the EDCA parameter set for the PCP (hereinafter simply referred to as the "PCP EDCA parameter set") adjusted.

In the method of adjusting the STA EDCA parameter set, at least one of the AIFS value and the CWmin and CWmax values of the STA EDCA parameter set is decreased. Then, it is possible to increase the frequency with which the STA accesses the communication channel.

In the method of adjusting the PCP EDCA parameter set, at least one of the AIFS value and the CWmin and CWmax values of the PCP EDCA parameter set is increased so as to decrease the frequency with which the PCP accesses the communication channel, thereby relatively increasing the frequency with which the STA accesses the communication channel.

In adjusting the PCP EDCA parameter set, the frequency with which the STA accesses the communication channel may be adjusted by also referring to the self-terminal occupation time (S) and the amount of data transmitted from the PCP, which is possible to calculate by the first traffic measuring unit 23. A parameter to be adjusted among parameters in the PCP EDCA parameter set may be the same as that in the STA EDCA parameter set. In this case, a parameter is adjusted by using the average different-terminal occupation time $\mu D$ and the traffic V, as shown in FIG. 5.

An example in which the STA EDCA parameter set is adjusted online discussed above. Alternatively, plural combinations of related EDCA parameter sets may be calculated by conducting offline experiments, and then, an appropriate EDCA parameter set may be properly selected online. That is, by using the average different-terminal occupation time $\mu D$ and the traffic V, EDCA parameter sets suitable for each adjusting area may be determined by conducting experiment in advance, and then, the appropriate EDCA parameter set may be selected in accordance with a calculation result, in an actual communication environment.

Figure 6:
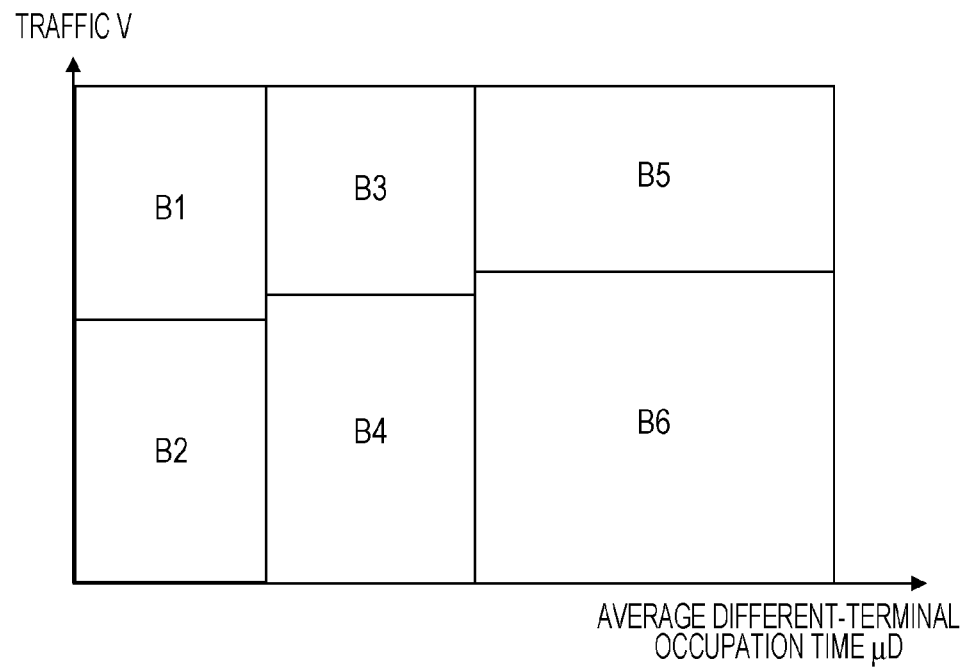
FIG. 6 is a graph illustrating another example of an adjusting area which is divided by using threshold values in order to adjust an EDCA parameter set by the first parameter adjusting unit.

FIG. 6 illustrates another example of an adjusting area for an EDCA parameter set. In the example shown in FIG. 6 the adjusting area is divided into six adjusting areas B1 through B6 in accordance with the average different-terminal occupation time $\mu D$ and the traffic V. EDCA parameter sets suitable for each adjusting area are prepared in advance, and the an EDCA parameter set corresponding to each adjusting area, is selected in accordance with the average different-terminal occupation time $\mu D$ and the traffic V in an actual communication environment.

The parameter updating unit 25 stores one or both of the STA EDCA parameter set and the PCP EDCA parameter set adjusted by the first parameter adjusting unit 24 in a memory (not shown), and then broadcasts the STA EDCA parameter set to the STA by using a beacon signal.

The parameter updating unit 25 does not necessarily broadcast the PCP EDCA parameter set to the STA. The PCP may utilize an EDCA parameter set different from that used by the STA, and this use case complies with the current IEEE802.11 standard.

As described above, in the first embodiment, the wireless communication system is capable of setting an EDCA parameter set which is suitable for the state of millimeter wave communication between the PCP and the STA. Accordingly, the wireless communication system is possible to suppress a decrease in the quality of service in millimeter wave communication.

In the first embodiment, the configuration of the PCP and that of the STA have been separately discussed. However, the PCP may integrate the functions of the STA. It is noted that the PCP may also be used as an STA.

Second Embodiment

In a second embodiment, the PCP of the wireless communication system, which discussed in the first embodiment shown in FIG. 1, determines the status of communication from the PCP to the STA performed on the basis of a PCP EDCA parameter set, and then adjusts the PCP EDCA parameter set on the basis of feedback information from an STA.

Figure 7:
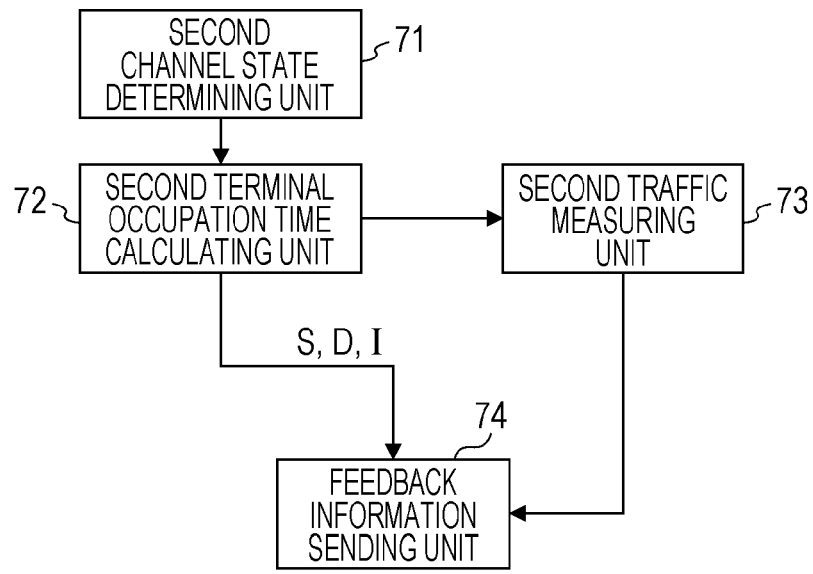
FIG. 7 is a block diagram illustrating an example of the internal configuration of an STA of a second embodiment.

FIG. 7 is a block diagram illustrating an example of the internal configuration of an STA of the second embodiment. The STA includes, as shown in FIG. 7, a second channel state determining unit 71, a second terminal occupation time calculating unit 72, a second traffic measuring unit 73, and a feedback information sending unit 74. The second channel state determining unit 71 and the second terminal occupation time calculating unit 72 respectively have the same functions as those of the first channel state determining unit 21 and the first terminal occupation time calculating unit 22 included in the PCP of the first embodiment. The second terminal occupation time calculating unit 72 calculates the self-terminal occupation time (S) used by the STA as the self-terminal and the different terminal occupation time (D) used by the PCP as the different terminal.

The second traffic measuring unit 73 measures the amount of data packets received from the PCP in each different-terminal occupation time (D) calculated by the second terminal occupation time calculating unit 72. The feedback information sending unit 74 sends, to the PCP, feedback information including information indicating the self-terminal occupation time (S), the different-terminal occupation time (D), the idle time (I), and the amount of data received from the PCP. The method for sending feedback information is not restricted, and the feedback information sending unit 74 utilizes, for example, an action frame.

Figure 8:
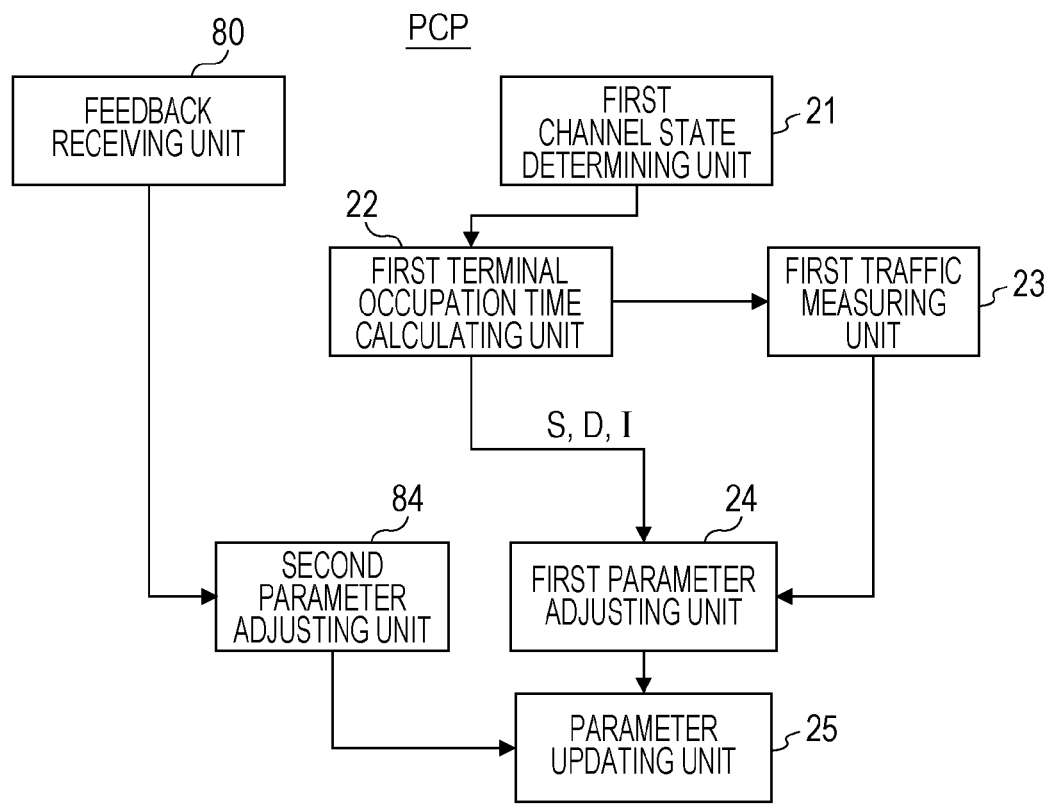
FIG. 8 is a block diagram illustrating an example of the internal configuration of a PCP of the second embodiment.

FIG. 8 is a block diagram illustrating an example of the internal configuration, of a PCP of the second embodiment. The PCP shown in FIG. 8 includes a feedback receiving unit 80 and a second parameter adjusting unit 84 in addition to the components of the PCP shown in FIG. 3 of the first embodiment. Components of the PCP of the second embodiment identical to or similar to those of the first embodiment are designated by like reference numerals, and thus, an explanation thereof will be simplified or omitted.

The feedback receiving unit 80 receives feedback information sent from the STA, which is information concerning values representing communication with the PCP measured by the STA. The feedback information includes information indicating the self-terminal occupation time (S), the different-terminal occupation time (D), the idle time (I), and the amount of data received from the PCP calculated by the STA shown in FIG. 7. The feedback receiving unit 80 outputs the received feedback information, to the second parameter adjusting unit 84.

In a manner similar to the first parameter adjusting unit 24 discussed in the first embodiment, the second parameter adjusting unit 84 calculates an average value of the different-terminal occupation times (D) (average different-terminal occupation time $\mu D$) included in the feedback information and an average value V of the amounts of received data (traffic) in the individual different-terminal occupation times (D) included in the feedback information.

The second parameter adjusting unit 84 may evaluate a currently used PCP EDCA parameter set on the basis of the average different-terminal occupation time $\mu D$ and the traffic V, and adjust the currently used PCP EDCA parameter set.

For adjusting the PCP EDCA parameter set by the second parameter adjusting unit 84, it may utilize a method similar to the method based on the adjusting area shown in FIG. 5 in the first embodiment. The average different-terminal occupation time $\mu D$ represented by the horizontal axis of the graph shown in FIG. 5 is equal to the time for which the PCP transmits data to the STA. The traffic V represented by the vertical axis of this graph indicates the average amount of received data in the individual different-terminal occupation times (D) measured by the STA during the certain period.

In the second embodiment, the parameter updating unit 25 stores the STA EDCA parameter set adjusted by the first parameter adjusting unit 24, the PCP EDCA parameter set adjusted by the second parameter adjusting unit 84, or both of the STA EDCA parameter set and the PCP EDCA parameter set in a memory (not shown). The parameter updating unit 25 then broadcasts the STA EDCA parameter set to the STA by using a beacon signal.

As described above, in the second embodiment, the wireless communication system is capable of setting a PCP EDCA parameter set which is suitable for the state of millimeter wave communication between the PCP and the STA. Accordingly, it is possible to suppress a decrease in the quality of service in millimeter wave communication.

Figure 9:
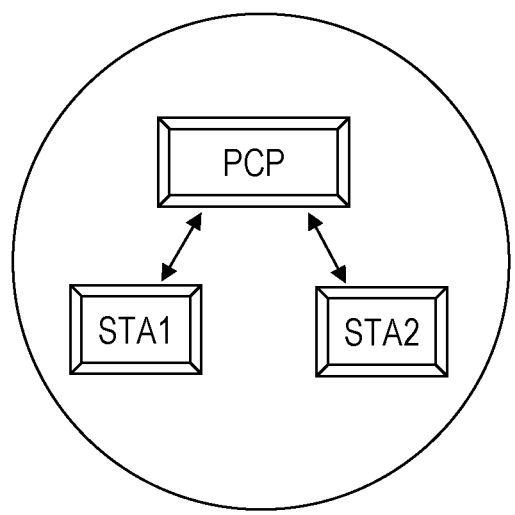
FIG. 9 illustrates a wireless communication system including one PCP and two STAs (STA1 and STA2) of a third embodiment.

Third Embodiment in the first and second embodiments, an example of a wireless communication system in which one STA is included in association, with one PCP discussed. In a third embodiment, an adjustment of an EDCA parameter set in a wireless communication system in which two STAs (STA1 and STA2) are included in association, with one PCP, as shown in FIG. 9, is described. The two STAs (STA1 and STA2) communicate with the same PCP by using a millimeter wave band. The same EDCA parameter set is broadcast to the two STAs (STA1 and STA2) from the PCP.

In the PCP of the third embodiment, the first terminal occupation time calculating unit 22 calculates the different terminal occupation time (D) for each STA. That is, it is necessary to add the results "carrier sense result=busy" used in calculating equation (2) for the two STAs. That is the first channel state determining unit 21 specifies an STA, which is a transmission source of data received by the PCP in a carrier sense period (AIFS). Then, the first occupation time calculating unit 22 calculates a channel occupation time (Di) of each STA according to the following equation (4). In equation (4), i denotes the i-th STA.

$$Di = \sum_{\text{(carrier sense result=idle) and (transmission source=i-th STA)}} AIFS \quad (4)$$

The first parameter adjusting unit 24 calculates an average different-terminal occupation time for each STA. The first parameter adjusting unit 24 then calculates an average value of the average different-terminal occupation times for all the STAs, and sets the calculated average value to be the average different-terminal occupation time μD. The other operations are the same as those of the first or second embodiment, and thus, an explanation thereof will be omitted.

As described above, even when a wireless communication system includes two STAs in association with one PCP, it is capable of setting an EDCA parameter set which is suitable for the state of millimeter wave communication between the PCP and the STAs. Although in the third embodiment two STAs are included in association with one PCP, the number of STAs is not restricted and may be three or more.

Fourth Embodiment

Figure 10:
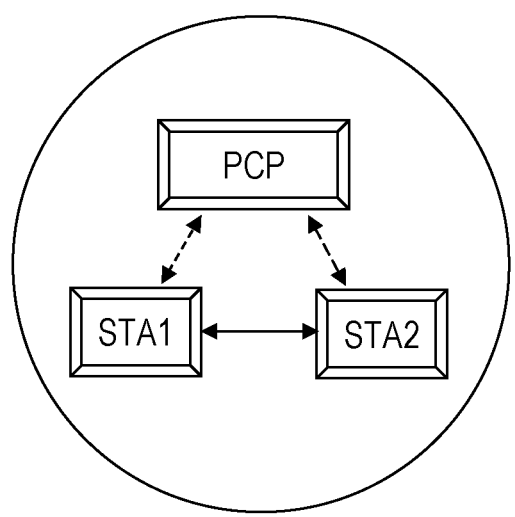
FIG. 10 illustrates a wireless communication system including one PCP and two STAs (STA1 and STA2) of a fourth embodiment.

In the third embodiment, an example of a wireless communication system in which two STAs (STA1 and STA2) communicate with the one PCP by using a millimeter wave band discussed. In a fourth embodiment, an adjustment of an EDCA parameter set in a wireless communication system in which two STAs (STA1 and STA2) communicate with each other by using a millimeter wave band without using a PCP, as shown in FIG. 10, is described. The same EDCA parameter set or different EDCA parameter sets are broadcast to the two STAs (STA1 and STA2) from the PCP.

Figures 11, 12:
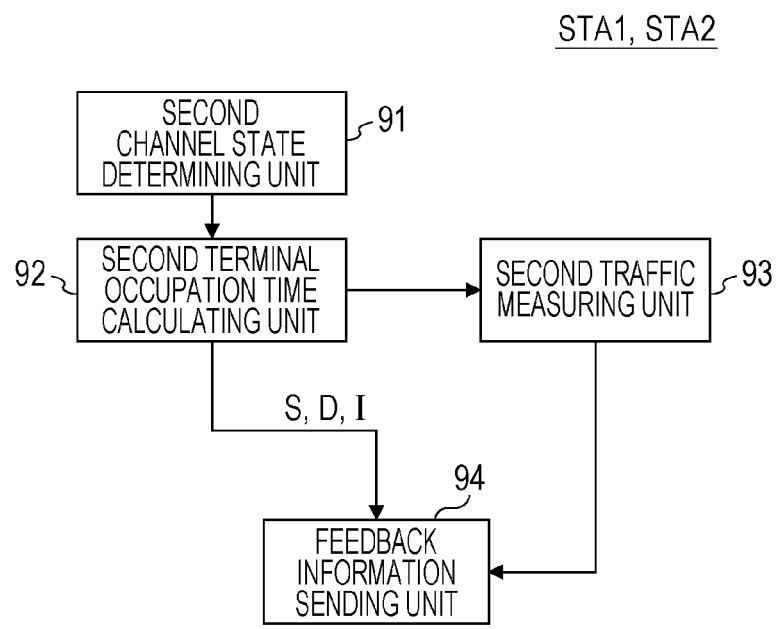
FIG. 11 is a block diagram illustrating an example of the internal configuration of each of the STAs (STA1 and STA2) of the fourth embodiment.
FIG. 12 illustrates examples of recommended values of EDCA parameter sets.

The configuration of each of the STAs (STA1 and STA2) of the fourth embodiment is similar to that of the second embodiment shown in FIG. 7. FIG. 11 is a block diagram illustrating an example of the internal configuration of each of the STAs (STA1 and STA2) of the fourth embodiment. The STA (for example, the STA1) includes, as shown in FIG. 11, a second channel state determining unit 91, a second terminal occupation time calculating unit 92, a second traffic measuring unit 93, and a feedback information sending unit 94. The second channel state determining unit 91 and the second terminal occupation time calculating unit 92 respectively have the same functions as those of the second channel state determining unit 71 and the second terminal occupation time calculating unit 72 included in the STA of the second embodiment. The self-terminal, of the self-terminal occupation time (S) calculated by the second terminal occupation time calculating unit 92 is the STA1, and the different terminal of the different-terminal occupation time (D) calculated by the second terminal occupation time calculating unit 92 is the STA2.

The second traffic measuring unit 93 measures the amount of data received from the STA2 in each different-terminal occupation time (D) calculated by the second terminal occupation time calculating unit 92. The feedback information sending unit 94 sends, to the PCP, feedback information including information indicating the self-terminal occupation time (5), the different-terminal occupation time (D), the idle time (I), and the amount of data received from the STA2. The configuration of the STA2 is similar to that of the STA1. Accordingly, feedback information sent from the STA2 to the PCP is information indicating the self-terminal occupation time (8) measured by the STA2, the different-terminal occupation time (D) measured by the STA2, the idle time (I), and the amount of data received from the STA1.

The configuration of the PCP of the fourth embodiment is similar to that of the third embodiment shown in FIG. 8. In the PCP of the fourth embodiment, the second parameter adjusting unit 84 may adjust an EDCA parameter set for the STA1 and STA2, on the basis of feedback information sent from each of the STA1 and STA2 received by the feedback receiving unit 80.

For utilizing the same EDCA parameter set by the STA1 and STA2, in compliance with the current IEEE802.11e standard (EDCA standard), the EDCA parameter set is determined as follows. The average different-terminal occupation time μD for all wireless terminal apparatuses is calculated from the average different-terminal occupation times obtained from the feedback information received from the STA and that from the STA2. Then, by utilizing the average different-terminal occupation time μD for all wireless terminal apparatuses, the EDCA parameter set is determined, as in the above-described embodiments.

Alternatively, the STA1 and STA2 may utilize different EDCA parameter sets, though this utilization does not comply with the current IEEE802.11e standard (EDCA standard). In this case, on the basis of a result received from one of the STAs (for example, the STA1), the PCP may determine an EDCA parameter set used for the STA2, which is a communication partner of the STA1, and may set the EDCA parameter set in the STA2. In the present disclosure, however, the method for setting different EDCA parameter sets in the STA1 and STA2 is not restricted.

As described above, in the fourth embodiment, even when a wireless communication system includes two STAs which communicate with each other in association with one PCP, it is capable of setting an STA EDCA parameter set which is suitable for the state of millimeter wave communication.

In the above-described first through fourth embodiments, the first parameter adjusting units 24 and the second parameter adjusting units 84 adjust EDCA parameter sets, regardless of the category type of the four access categories (ACs) defined in the EDCA system. Alternatively, the first parameter adjusting units 24 and the second parameter adjusting units 84 may adjust. EDC parameter sets corresponding to one or plural of the four ACs.

The following aspects of embodiments are included in the present disclosure.

A wireless communication apparatus according to a first aspect is a wireless communication apparatus which communicates with at least one wireless station apparatus by utilizing an EDCA mechanism. The wireless communication apparatus includes the following elements. A first channel state determining unit determines a usage state of a communication channel which is used between the wireless communication apparatus and the wireless station apparatus in a contention period of the communication channel. A first terminal occupation time calculating unit calculates, on the basis of the usage state, a different-terminal occupation time in the contention period of the communication channel. A first traffic measuring unit measures an amount of data received from the wireless station apparatus in the different-terminal occupation time. A first parameter adjusting unit adjusts an EDCA parameter set used in the EDCA mechanism, on the basis of the different-terminal occupation time and the amount of data received from the wireless station apparatus. A parameter updating unit updates the EDCA parameter set to an adjusted. EDCA parameter set.

According to a second aspect, the wireless communication apparatus of the first aspect may further include a sending unit that sends the adjusted EDCA parameter set to the wireless station apparatus.

According to a third aspect, in the wireless communication apparatus according to the first aspect, the EDCA parameter set may include an EDCA parameter set for the wireless station apparatus and an EDCA parameter set for the wireless communication apparatus, and the first parameter adjusting unit may adjust at least one of the EDCA parameter set for the wireless station apparatus and the EDCA parameter set for the wireless communication apparatus.

According to a fourth aspect, the wireless communication apparatus according to the first aspect may further include the following elements. A feedback receiving unit receives feedback information, including information indicating a different-terminal occupation time and an amount of received data measured by the wireless station apparatus. A second parameter adjusting unit adjusts the EDCA parameter set, on the basis of toe different-terminal occupation time and the amount of received data indicated by information included in the feedback information.

According to a fifth aspect, in the wireless communication apparatus according to the first aspect, in a situation where the wireless communication apparatus communicates with a plurality of wireless station apparatuses, the first channel state determining unit may determine a usage state of the communication channel which is used between the wireless communication apparatus and each wireless station apparatus, and the first terminal occupation time calculating unit may calculate a different-terminal occupation time used by each wireless station apparatus.

According to a sixth aspect, in the wireless communication apparatus according to the fourth aspect, in a situation where the wireless communication apparatus communicates with a plurality of wireless station apparatuses and where the plurality of wireless station apparatuses transmit and receive data to and from each other without using the wireless communication apparatus, the feedback receiving unit may receive feedback information including information indicating a different-terminal occupation time calculated by a first wireless station apparatus among the plurality of wireless station apparatuses and an amount of data received by the first wireless station apparatus, and the second parameter adjusting unit may adjust the EDCA parameter set used in the EDCA mechanism, on the basis of the different-terminal occupation time calculated by the first wireless station apparatus and the amount of data received by the first wireless station apparatus.

According to a seventh aspect, in the wireless communication apparatus according to the first aspect, the first parameter adjusting unit may adjust the EDCA parameter set by a combination, of a length of the different-terminal occupation time and the amount of received data.

According to an eighth aspect, in the wireless communication apparatus according to the seventh aspect, in a situation where the length of the different-terminal occupation time is short and where the amount of received data is small, the first parameter adjusting unit may adjust the EDCA parameter set by decreasing a time for which the wireless station apparatus transmits data to the wireless communication apparatus.

According to a ninth aspect, in the wireless communication apparatus according to the seventh aspect, in a situation where the length of the different-terminal occupation time is short and where the amount of received data is large, the first parameter adjusting unit may adjust the EDCA parameter set by decreasing a time for which the wireless station apparatus transmits data to the wireless communication apparatus or by increasing the frequency with which the wireless station apparatus accesses the communication channel.

According to a tenth aspect, in the wireless communication apparatus according to the seventh aspect, in a situation where the length of the different-terminal occupation time is long, the first parameter adjusting unit may adjust the EDCA parameter set by decreasing a time for which the wireless station apparatus transmits data to the wireless communication apparatus or by increasing frequency with which the wireless station apparatus accesses the communication channel.

According to an eleventh aspect, in the wireless communication apparatus according to the first aspect, the first parameter adjusting unit may adjust EDCA parameter sets corresponding to one or plural of access categories defined in the EDCA mechanism.

A wireless station apparatus according to a twelfth aspect is a wireless station apparatus (STA) which communicates with a wireless communication apparatus (PCP) by utilizing an EDCA mechanism. The wireless station apparatus includes the following elements. A second channel state determining unit determines a usage state of a communication channel which used between the wireless communication apparatus and the wireless station apparatus in a contention period of the communication channel. A second terminal occupation time calculating unit calculates, on the basis of the usage state, a different-terminal occupation time in the contention period of the communication channel. A second traffic measuring unit measures an amount of data received from the wireless communication apparatus in the different-terminal occupation time. A feedback information sending unit sends feedback information including information indicating the different-terminal occupation time and the amount of data received from the wireless communication apparatus to the wireless communication apparatus.

According to a thirteenth aspect, in the wireless station apparatus according to the twelfth aspect, in a situation where the wireless communication apparatus communicates with the wireless station apparatus and a different wireless station apparatus and where the wireless station apparatus and the different wireless station apparatus communicate data each other without using the wireless communication apparatus, the second channel state determining unit may determine a usage state of a communication channel which is used between the wireless station apparatus and the different wireless station apparatus in a contention period of the communication channel, the second terminal occupation time calculating unit may calculate, on the basis of the usage state, a different-terminal occupation time used by the different wireless station apparatus in the contention period of the communication channel, the second traffic measuring unit may measure an amount of data received from the different wireless station apparatus in the different-terminal occupation time used by the different wireless station apparatus, and the feedback information sending unit may send feedback information including information indicating the different-terminal occupation time used by the different wireless station apparatus and the amount of data received from the different wireless station apparatus to the wireless communication apparatus.

A wireless communication method according to a fourteenth aspect is a wireless communication method for a wireless communication apparatus which communicates with at least one wireless station apparatus by utilizing an EDCA mechanism. The wireless communication method includes: determining a usage state of a communication channel which is used between the wireless communication apparatus and the wireless station apparatus in a contention period of the communication channel; calculating, on the basis of the usage state, a different-terminal occupation time in the contention period of the communication channel; measuring an amount of data received from the wireless station apparatus in the different-terminal occupation time; adjusting an EDCA parameter set used in the EDCA system, on the basis of the different-terminal occupation time and the amount of data received from the wireless station apparatus; and a step of updating the EDCA parameter set to an adjusted EDCA parameter set.

While the present disclosure described through illustration of various embodiments with reference to the drawings, it is to be understood that the present disclosure is not limited to the disclosed exemplary embodiments. Obviously, various modifications and variations will be apparent to practitioners skilled in the art within the scope of the claims, and it is to be understood that such modifications and variations are encompassed within the technical scope of the present disclosure. The components of the above-described embodiments may be combined as desired without departing from the scope of the disclosure.

In the above-described embodiments, an example in which the disclosure is implemented by using hardware discussed. However, the disclosure may be implemented by using software in cooperation with hardware.

The functional blocks utilized for describing the above-described embodiments are implemented typically by a large scale integrated circuit (LSI), which is one example of integrated circuits. These functional blocks may be individually formed into a single chip, or some or all of the functional blocks may be formed into one chip. Such an LSI may be called an IC, a system LSI, a super LSI, or an ultra LSI, depending on the integration degree.

The integration technology of the functional blocks is not restricted to an LSI technology. Instead, a dedicated circuit or a genera-purpose processor may be used. For example, a field programmable gate array (FPGA) that is programmable after it is manufactured, or a reconfigurable processor that may reconfigure connections or settings of circuit cells within this processor may be used.

Further, due to the progress of semiconductor technologies or the appearance of a derivative technology, if a circuit integration technology which replaces an LSI technology is developed, the functional blocks may be integrated by utilizing such a technology. The application of a biotechnology, for example, may be one of such cases.

A wireless communication apparatus according to an embodiment of the present disclosure, which is compliant with the EDCA standard, is suitably used as a communication apparatus that improves the channel occupancy rate and the communication quality by evaluating the validity of a currently used EDCA parameter set through the measurement and the division of a channel access state and by adaptively determining an EDCA parameter set which is suitable for a communication environment.

What is claimed is:

1. A wireless communication apparatus which communicates with one or more wireless station apparatuses by utilizing an enhanced distributed channel access (EDCA) mechanism, comprising:

first channel state determining circuitry, which, in operation, determines, per time unit, a usage state of a communication channel which is used between the wireless communication apparatus and the one or more wireless station apparatuses in a contention period of the communication channel, in a situation where the wireless communication apparatus communicates with the one or more wireless station apparatuses, based on a usage by the wireless communication apparatus, a usage by the one or more wireless station apparatuses and an idling state;

first terminal occupation time calculating circuitry, which, in operation, classifies, on the basis of the usage state, the contention period of the communication channel into a self-terminal occupation time used by the wireless communication apparatus, a different-terminal occupation time used by one of the one or more wireless station apparatuses, and an idle time, and calculates, on the basis of the usage state, a different-terminal occupation time used by one of the one or more wireless station apparatuses in the contention period of the communication channel;

first traffic measuring circuitry, which, in operation, measures an amount of data received from the wireless station apparatus in the different-terminal occupation time;

first parameter adjusting circuitry, which, in operation, adjusts an EDCA parameter set used in the EDCA mechanism, on the basis of the different-terminal occupation time and the amount of data received from the one or more wireless station apparatuses;

parameter updating circuitry, which, in operation, updates the EDCA parameter set to an adjusted EDCA parameter set;

feedback receiving circuitry, which, in operation, receives feedback information including information indicating a different-terminal occupation time and an amount of received data measured by the one or more wireless station apparatuses; and second parameter adjusting circuitry, which, in operation, adjusts the EDCA parameter set, on the basis of the different-terminal occupation time and the amount of received data indicated by the feedback information.

2. The wireless communication apparatus according to claim 1, comprising:

sending circuitry, which, in operation, sends the adjusted EDCA parameter set to the one or more wireless station apparatuses.

3. The wireless communication apparatus according to claim 1, wherein:

the EDCA parameter set includes an EDCA parameter set for the one or more wireless station apparatuses and an EDCA parameter set for the wireless communication apparatus; and the first parameter adjusting circuitry adjusts at least one of the EDCA parameter set for the one or more wireless station apparatuses and the EDCA parameter set for the wireless communication apparatus.

4. The wireless communication apparatus according to claim 1, wherein, in a situation where the wireless communication apparatus communicates with a plurality of the one or more wireless station apparatuses, the first channel state determining circuitry determines a usage state of the communication channel which is used between the wireless communication apparatus and each of the plurality of wireless station apparatuses, and the first terminal occupation time calculating circuitry calculates a different-terminal occupation time used by each of the plurality of wireless station apparatuses.

5. The wireless communication apparatus according to claim 1, wherein, in a situation where the wireless communication apparatus communicates with a plurality of the one or more wireless station apparatuses and where the plurality of wireless station apparatuses transmit and receive data to and from each other without using the wireless communication apparatus, the feedback receiving circuitry receives feedback information including information indicating a different-terminal occupation time calculated by a first wireless station apparatus among the plurality of wireless station apparatuses and an amount of data received by the first wireless station apparatus, and the second parameter adjusting circuitry adjusts the EDCA parameter set, on the basis of the different-terminal occupation time calculated by the first wireless station apparatus and the amount of data received by the first wireless station apparatus.

6. The wireless communication apparatus according to claim 1, wherein the first parameter adjusting circuitry adjusts the EDCA parameter set by a combination of a length of the different-terminal occupation time and the amount of received data.

7. The wireless communication apparatus according to claim 6, wherein, in a situation where the length of the different-terminal occupation time is short and where the amount of received data is small, the first parameter adjusting circuitry adjusts the EDCA parameter set by decreasing a permitted period for which the one or more wireless station apparatuses transmit data to the wireless communication apparatus.

8. The wireless communication apparatus according to claim 6, wherein, in a situation where the length of the different-terminal occupation time is short and where the amount of received data is large, the first parameter adjusting circuitry adjusts the EDCA parameter set by decreasing a permitted period for which the one or more wireless station apparatuses transmit data to the wireless communication apparatus or by increasing a frequency with which the one or more wireless station apparatuses access the communication channel.

9. The wireless communication apparatus according to claim 6, wherein, in a situation where the length of the different-terminal occupation time is long, the first parameter adjusting circuitry adjusts the EDCA parameter set by decreasing a permitted period for which the one or more wireless station apparatuses transmit data to the wireless communication apparatus or by increasing a frequency with which the one or more wireless station apparatuses access the communication channel.

10. The wireless communication apparatus according to claim 1, wherein the first parameter adjusting circuitry adjusts EDCA parameter sets corresponding to one or plural of access categories defined in the EDCA mechanism.

11. A wireless station apparatus which communicates with a wireless communication apparatus by utilizing an enhanced distributed channel access (EDCA) mechanism, comprising:

second channel state determining circuitry, which, in operation, determines, per unit time, a first usage state of a communication channel which is used between the wireless communication apparatus and the wireless station apparatus in a contention period of the communication channel based on a usage by the wireless communication apparatus, a usage by the wireless station apparatus and an idling state;

second terminal occupation time calculating circuitry, which, in operation, classifies, on the basis of the usage state, the contention period of the communication channel into a self-terminal occupation time used by the wireless communication apparatus, a different-terminal occupation time used by one of the one or more wireless station apparatuses, and an idle time, and calculates, based on the first usage state, a different-terminal occupation time used by the wireless station apparatus in the contention period of the communication channel;

second traffic measuring circuitry, which, in operation measures an amount of data received from the wireless communication apparatus in the different-terminal occupation time; and feedback information sending circuitry, which, in operation, sends feedback information including information indicating the different-terminal occupation time and the amount of data received from the wireless communication apparatus to the wireless communication apparatus, wherein an EDCA parameter set is adjusted on the basis of the different-terminal occupation time and the amount of received data indicated by the feedback information.

12. The wireless station apparatus according to claim 11, wherein, in a situation where the wireless communication apparatus communicates with the wireless station apparatus and a different wireless station apparatus and where the wireless station apparatus and the different wireless station apparatus transmit and receive data to and from each other without using the wireless communication apparatus, the second channel state determining circuitry determines, per unit time, a second usage state of a communication channel which is used between the wireless station apparatus and the different wireless station apparatus in a contention period of the communication channel based on the usage by the wireless station apparatus, a usage by the different wireless station apparatus, and the idling state, the second terminal occupation time calculating circuitry calculates, based on the second usage state, a different-terminal occupation time used by the different wireless station apparatus in the contention period of the communication channel, the second traffic measuring circuitry measures an amount of data received from the different wireless station apparatus in the different-terminal occupation time used by the different wireless station apparatus, and the feedback information sending circuitry sends feedback information including information indicating the different-terminal occupation time used by the different wireless station apparatus and the amount of data received from the different wireless station apparatus to the wireless communication apparatus.

13. A wireless communication method for a wireless communication apparatus which communicates with one or more wireless station apparatuses by utilizing an enhanced distributed channel access (EDCA) mechanism, comprising:

determining, per unit time, a usage state of a communication channel which is used between the wireless communication apparatus and the one or more wireless station apparatuses in a contention period of the communication channel based on a usage by the wireless communication apparatus, a usage of the one or more wireless communication apparatuses and an idling state;

classifying, on the basis of the usage state, the contention period of the communication channel into a self-terminal occupation time used by the wireless communication apparatus, a different-terminal occupation time used by one of the one or more wireless station apparatuses, and an idle time;

calculating, based on the usage state, a different-terminal occupation time used by one of the one or more wireless station apparatuses in the contention period of the communication channel;

measuring an amount of data received from the one or more wireless station apparatuses in the different-terminal occupation time;

adjusting an EDCA parameter set used in the EDCA system, on the basis of the different-terminal occupation time and the amount of data received from the one or more wireless station apparatuses;

updating the EDCA parameter set to an adjusted EDCA parameter set;

receiving feedback information including information indicating a different-terminal occupation time and an amount of received data measured by the one or more wireless station apparatuses; and adjusting the adjusted EDCA parameter set, on the basis of the different-terminal occupation time and the amount of received data indicated by the feedback information.

14. The wireless communication apparatus according to claim 1, wherein the usage by the wireless communication apparatus is a transmission period (TXOP) in a contention-based access period (CBAP), the usage by the one or more wireless station apparatuses is a carrier sense period (AIFS) in which a result of a carrier sensing process is busy in the CBAP, the idling state includes a combination of the AIFS in which a result of the carrier sensing process is not busy and a background time (CW); and the first channel state determining circuitry determines whether a contention-based access period (CBAP) is in a carrier sense period (AIFS), a background time (CW), or a transmission period (TXOP), as the usage state.

\* \* \* \* \*